R. FISCHER.
CLUTCH FOR SCARF PINS, HAT PINS, AND THE LIKE.
APPLICATION FILED SEPT. 13, 1910.

1,089,755.  Patented Mar. 10, 1914.

Witnesses:  Inventor:
Robert Fischer
By his Attorney,

UNITED STATES PATENT OFFICE.

ROBERT FISCHER, OF NEW YORK, N. Y., ASSIGNOR TO MAX H. FISCHER, OF EAST ORANGE, NEW JERSEY.

CLUTCH FOR SCARF-PINS, HAT-PINS, AND THE LIKE.

1,089,755.

Specification of Letters Patent.

Patented Mar. 10, 1914.

Application filed September 13, 1910. Serial No. 581,810.

*To all whom it may concern:*

Be it known that I, ROBERT FISCHER, a citizen of the United States, and residing at the city of New York, borough of Brooklyn, in the county of Kings and State of New York, have invented certain new and useful Improvements in Clutches for Scarf-Pins, Hat-Pins, and the like, of which the following is a specification.

More particularly my invention relates to an improvement upon a clutch of the type shown and described in Reissue Letters Patent of the United States #13,009 to Max. H. Fischer granted August 17th, 1909 (being a reissue of Patent No. 700,412, dated May 20th, 1902).

My improved device comprises, in combination a pin-receiving member provided with an inclined face, a carrier extending within said pin-receiving member, the said pin-receiving member and carrier being capable of relative longitudinal movement,— a gripping device carried by the carrier and moved by engagement with the inclined face of the pin-receiving member, and a releasing or operating part connected to said carrier and extending outwardly and upwardly so as to substantially inclose the pin-receiving member and other parts. A spring or other suitable means may also be provided for forcing the carrier and inclined face of the pin-receiving member toward each other.

Figure 1:
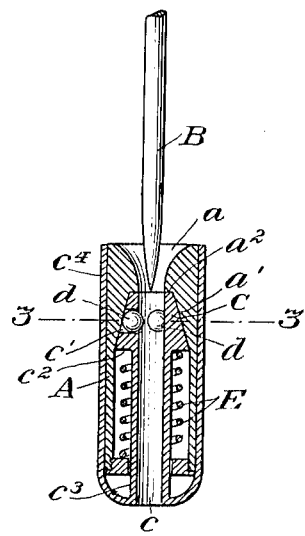
Figure 2:
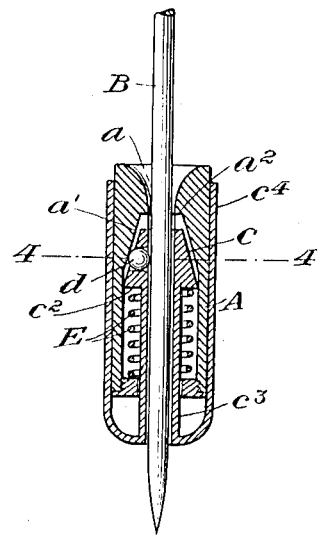
Figure 3:
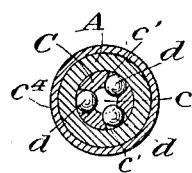
Figure 4:
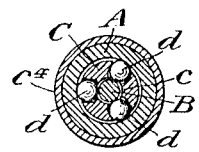
Figure 5:
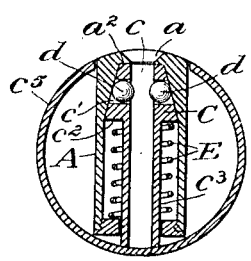

In the accompanying drawings in which similar reference characters designate corresponding parts throughout the several views, Figure 1 is a longitudinal sectional view of a device illustrating my invention and showing the normal position of the parts; Fig. 2 is a similar view, showing the position of the parts when a pin is gripped by the clutch; Fig. 3 is a transverse sectional view in line 3—3 of Fig. 1; Fig. 4 is a similar view in line 4—4 of Fig. 2; Fig. 5 is a longitudinal section of a modified form of the clutch, showing the parts in a slightly different position.

Referring now to these drawings, A designates a pin-receiving member, which as shown is in the form of a hollow cylinder or tube, having a bore or hole at one end for the insertion of a pin and is also provided with an internal conical face $a'$ which tapers toward the hole $a$ in the end of the casing and the smallest diameter of which is preferably larger than the diameter of the hole $a$ in order to provide a shoulder or face $a^2$. The conical face is not essential as one or more inclined faces will serve the purpose.

C indicates a spring pressed carrier provided with a central bore or hole $c$ which is alined with and of substantially the same diameter as the hole $a$ in the end of the pin-receiving member. The carrier is also provided with lateral holes or pockets $c'$, intersecting the bore $c$ and in which are confined gripping devices $d$, which ride on the conical face $a''$ and are of a size sufficient to protrude from the pockets into the bore $c$ when the spring-pressed carrier forces them toward the small end of the conical face $a'$. Any suitable spring may be employed for moving the carrier and pin-receiving member relatively to each other, a coil spring E being shown in Figs. 1 and 2 arranged around a part of the carrier. The shape of the carrier is immaterial, though that shown which is frusto-conical is desirable, inasmuch as the base of the cone slides on the inner wall of the pin-receiving member and is guided thereby. The number and shape of the gripping devices may be varied, three spheres or balls being preferred, and preferably the inner ends of the pockets $c'$ are smaller in diameter than the largest diameter of the gripping devices in order to prevent the escape of the latter from the pockets into the bore $c$.

$c^3$ indicates an operating part secured to the carrier for moving the same away from the conical face $a'$, so as to permit the gripping devices to recede from and release the pin. This operating part, as shown, extends downwardly or rearwardly as in the said Fischer patent and then extends outwardly and forwardly so as to form an envelop $c^4$ which incloses the pin-receiving member which in the preferred form shown in these drawings incloses the other parts of the clutch.

When it is desired to use this clutch as a scarf-pin retainer, I preferably continue the bore of the carrier through the outer envelop or operating part. When it is desired to use the same as a hat-pin clutch, I preferably seal up the hole at the lower end of the device so as not to permit the pin to extend entirely through the device, as shown in Fig. 5. In said Fig. 5, I have shown the outer operating part in the form of a ball $c^5$ instead of a cylinder as in Figs. 1 to 4.
The operation of the clutch is substantially as follows: Assuming the parts to be in their normal position shown in Figs. 1 and 5 with the carrier pressed forwardly against the shoulder $a^2$ and the gripping device protruding into the bore $c$ of the carrier, when the pin is inserted through the opening $a$ into the carrier, its passage will be obstructed by the protruding gripping devices. By pushing on the pin, the gripping devices are compelled to roll along the incline of the pin receiving member and force the said pin-receiving member and carrier to move longitudinally relatively to each other, and the pin is permitted to enter the bore. This relative longitudinal movement causes the pin-receiving member A to move a very slight distance forwardly of the envelop $c^4$. This slight movement forward or in advance of the outer envelop $c^4$ is sufficient to act as a guard or buffer should an attempt be made to remove the pin from a scarf, hat or other article through which the pin has first been passed, and my said clutch is therefore useful to prevent the theft or accidental loss of valuable pins. Furthermore, the entire surface of the clutch can be grasped by the user for the purpose of sliding the same on or removing the same from a pin.
Many modifications and changes will readily suggest themselves to those skilled in the art, as for instance, instead of the carrier having a reduced portion, as shown, with a spring surrounding such reduced portion, the pin-receiving member A might be reduced at any point forward of the incline or conical face and the spring may be arranged between said reduced pin-receiving section and the outer envelop or carrier.
It will be seen that my improved clutch is at all times ready for removal and actually does not act as a retainer until an attempt is made to remove the pin from the scarf, hat or other article. In other words it is at all times movable in either direction on the pin by the user and it is only when the slightly extending pin-receiving member comes into contact with an intervening article that it operates. This feature makes it capable of quick removal from the pin.

Having described my invention, I claim:—

1. In a clutch for scarf-pins, hat-pins and the like, the combination with a pin-receiving member having a hole in one end and an inclined face, of a carrier,—the said carrier and pin-receiving member being capable of relative longitudinal movement,— a gripping device carried by said carrier and moved by engagement with the inclined face of the pin-receiving member, and an operating part for said carrier comprising an outer envelop substantially inclosing the pin-receiving member and other parts of the clutch.

2. In a clutch, the combination of a body portion, a gripping device carried by the body portion and so guided as to be capable of lateral movement only with reference thereto, and a member within the said body, capable of movement in a line perpendicular to that of the gripping device, the said member having a bore parallel with its line of movement and also having a portion with an inclined surface adapted to engage and move the gripping device.

3. In a clutch, the combination of a body portion, a gripping device carried by the body portion and so guided as to be capable of lateral movement only with reference thereto, a member within the said body, capable of movement in a line perpendicular to that of the gripping device, the said member having a bore parallel with its line of movement and also having a portion with an inclined surface adapted to engage and move the gripping device, and means for automatically bringing the said member into engagement with the gripping device.

4. A clutch comprising a gripping device and means for supporting same, a spring, an operator moved by the spring and adapted to operate and give gripping power to the gripping device, proportional to the strength of the spring, and a casing inclosing all of the aforesaid parts save a relatively small portion of the operator, the said portion being so situated with reference to the direction of movement imparted to it by the spring, that external pressure applied to it will supplement the action of the spring and augment the gripping power.

5. A clutch comprising a carrier having a central bore and one or more transverse holes communicating therewith, a gripping device confined in each hole, a casing nearly inclosing the carrier and partially supported thereby, but movable with reference thereto, the said casing having an interior inclined portion adapted to engage and move the gripping devices, and an aperture opening into the small part thereof, and a superimposed casing, open at one end and attached at the other end to the carrier.

6. A clutch comprising a carrier having a central bore and one or more transverse holes communicating therewith, a gripping device confined in each hole, a casing nearly inclosing the carrier and partially supported thereby, but movable with reference thereto, the said casing having an interior inclined portion adapted to engage and move the gripping devices, and an aperture opening into the small part thereof, a spring coiled around the carrier and confined between an enlarged part of the carrier and a contracted part of the casing, and a superimposed casing, open at one end and attached at the other end to the carrier.

In witness whereof, I have signed my name to the foregoing specification in the presence of two subscribing witnesses.

ROBERT FISCHER.

Witnesses:
   Jos. F. O'Brien,
   Helen V. Holmes.